(12) United States Patent
Brunt et al.

(10) Patent No.: US 6,717,383 B1
(45) Date of Patent: Apr. 6, 2004

(54) FOUNTAIN CONTROL FOR GENERATING DYNAMICALLY CHANGING FLOW PATTERNS

(76) Inventors: Chris S. Brunt, P.O. Box 325, Topanga, CA (US) 90290; Gary R. Fisher, P.O. Box 25959, Los Angeles, CA (US) 90025

( * ) Notice: Subject to any disclaimer, the term of this patent is extended or adjusted under 35 U.S.C. 154(b) by 108 days.

(21) Appl. No.: 09/650,878

(22) Filed: Aug. 30, 2000

(51) Int. Cl.[7] ........................ F04B 49/20; B05B 12/06
(52) U.S. Cl. ........................ 318/723; 239/18; 239/23; 318/722
(58) Field of Search ........................ 318/700, 720, 318/722, 723, 724; 388/907.5, 908, 909; 239/16, 17, 18, 20, 22, 23

(56) References Cited

U.S. PATENT DOCUMENTS

| | | | | |
|---|---|---|---|---|
| 3,600,655 A | * | 8/1971 | Karlin et al. | 318/257 |
| 4,091,294 A | * | 5/1978 | Zankl et al. | 318/773 |
| 4,308,491 A | * | 12/1981 | Joyner, Jr. et al. | 318/732 |
| 4,705,216 A | * | 11/1987 | Kaffka et al. | 239/18 |
| 4,736,148 A | * | 4/1988 | Hirata | 318/812 |
| 4,844,341 A | * | 7/1989 | Alba | 239/18 |
| 4,919,596 A | * | 4/1990 | Slate et al. | 417/18 |
| 5,069,387 A | * | 12/1991 | Alba | 239/18 |
| 5,239,250 A | * | 8/1993 | Kalman et al. | 318/729 |
| 5,269,659 A | * | 12/1993 | Hampton et al. | 417/12 |
| RE35,362 E | * | 10/1996 | Arvidson et al. | 169/13 |
| 6,206,298 B1 | * | 3/2001 | Ting | 239/20 |
| 6,276,612 B1 | * | 8/2001 | Hall | 239/17 |
| 6,316,895 B1 | * | 11/2001 | Ramarathnam | 318/439 |

* cited by examiner

Primary Examiner—Bentsu Ro

(57) ABSTRACT

A programmable fountain controller for varying the flow rate of an AC PMSM fountain pump in a pre-determined manner so as to generate dynamically changing flow patterns. A micro-controller is provided to vary the pulse width and frequency timing over time for generating signals to an output switching circuit that drives the pump. A mode switch provides user-settable modes of operation selected from a group comprising a programmed flow control mode, a manual flow setting mode, an audio input mode and an external data input/output mode.

9 Claims, 5 Drawing Sheets

FOUNTAIN CONTROL FOR GENERATING DYNAMICALLY CHANGING FLOW PATTERNS

BACKGROUND OF THE INVENTION

This invention relates to water fountains and an associated programmable controller for generating dynamically changing flow patterns.

Current indoor water fountains especially those intended for tabletop use generally have a preset flow rate and one or more outlets to channel water over the fountain elements. These fountains are non-dynamic and have a fixed flow pattern.

Virtually all indoor fountains employ a low power alternating current submersible pump. These pumps are generally comprised of a single-phase permanent-magnet synchronous motor (PMSM) with a multi-pole permanent-magnet rotor and a coupled impeller. Such pumps normally have no directional preference and are characterized by having notoriously low start-up torque. In order to overcome the low start-up torque problem and attain a pump with reliable starting characteristics, impellers have been designed with flexible blades and with mechanical slip-clutch arrangements to allow the rotor to begin rotation without having to overcome the water resistance of the impeller. These slip-clutch arrangements allow the impeller to rotate freely for a portion of one revolution before engaging a stop that prevents further rotation of the impeller relative to the rotor. Even with these modifications the majority of such pumps do not reliably start which is unfortunate in a fountain application. Pump and impeller apparatus with the above characteristics have been taught by Cabalcante (U.S. Pat. No. 4,247,265), Ellis, et al (U.S. Pat. No. 5,282,961) and Willinger and Ivasauskas (U.S. Pat. No. 4,861,468). These and functionally similar pumps are used extensively worldwide both in small fountain and aquarium applications.

A number of large-scale fountains with dynamic elements primarily designed for outside use has been reported. Owing to the method of water distribution and control, these are generally quite expensive to implement. Alba (U.S. Pat. No. 5,069,387) teaches a fountain with a multiplicity of nozzles with valves that are controlled by a microprocessor to vary flow rates. Chikazumi (U.S. Pat. No. 5,288,018) teaches a fountain with valves that are turned on and off by a controller to produce a variation of flows over a fountain wall. Dach (U.S. Pat. No. 5,439,170) teaches a fountain with a plurality of nozzles and valves that are turned off and on by a computer to produce various ornamental effects. Fuller and Robinson (U.S. Pat. No. 4,892,250) teach dynamic fountains with a number of computer controlled proportional valves feeding a number of nozzles. Przystawik (U.S. Pat. No. 4,269,352) teaches a dynamic fountain with a plurality of nozzles linked to pumps that are selectively turned on and off by electrical circuitry. None of these control the flow rate to the fountain elements by varying the flow rate of the individual pumps.

Various attempts to make fountains with changeable lighting have been reported. Evans (U.S. Pat. No. 305,117) teaches a fountain illuminated by a color blending system that responds to variations in amplitude and frequency of a music signal. Chikazumi (U.S. Pat. No. 5,288,018) reports a fountain with rear disposed lighting modules whose intensity can be selectively varied. Dach (U.S. Pat. No. 5,439,170) teaches a plurality of lamps that can be varied in response to music. While controlling fountain lighting, none of these inventions effect a variation in individual nozzle output proportional to the amplitude or frequency of the input sounds.

BRIEF SUMMARY OF THE INVENTION

It is a primary objective of this invention to provide a programmable controller for varying the flow rate of the fountain in a predetermined manner by varying the flow rate of a pump so as to generate dynamically changing flow patterns.

It is a related object of this invention to provide a variation in the flow rate of water to a fountain element by simultaneously changing the frequency and pulse width of an alternating current (AC) input to an alternating current permanent-magnet synchronous motor pump in such a manner that the motor's power requirements are met over as wide a speed range as possible.

It is a related object of this invention to provide a programmable fountain pump control for generating a predetermined multiplicity of sequential flow volumes to a fountain so as to generate changeable water flow patterns over time.

It is a related object of this invention to provide a programmable pump control coupled with a rigidly connected rotor and impeller assembly that will repeatably and reliably start and will operate without impeller chatter.

It is a related object of this invention to provide a microprocessor driven control to vary the output of a low voltage AC PMSM in a predetermined manner.

It is a related object of this invention to provide a pump control that varies pump output in response to changes in the ambient sound level, to changes in an external audio signal and to changes in an external data input/output signal.

These and other objects of the invention are met by a programmable fountain controller for varying the flow rate of a fountain pump in a predetermined manner, wherein the mode of operation is selected from a group comprising a programmed mode, an audio input mode, a manual mode and an external data input/output mode.

DETAILED DESCRIPTION OF THE INVENTION

Figure 1:
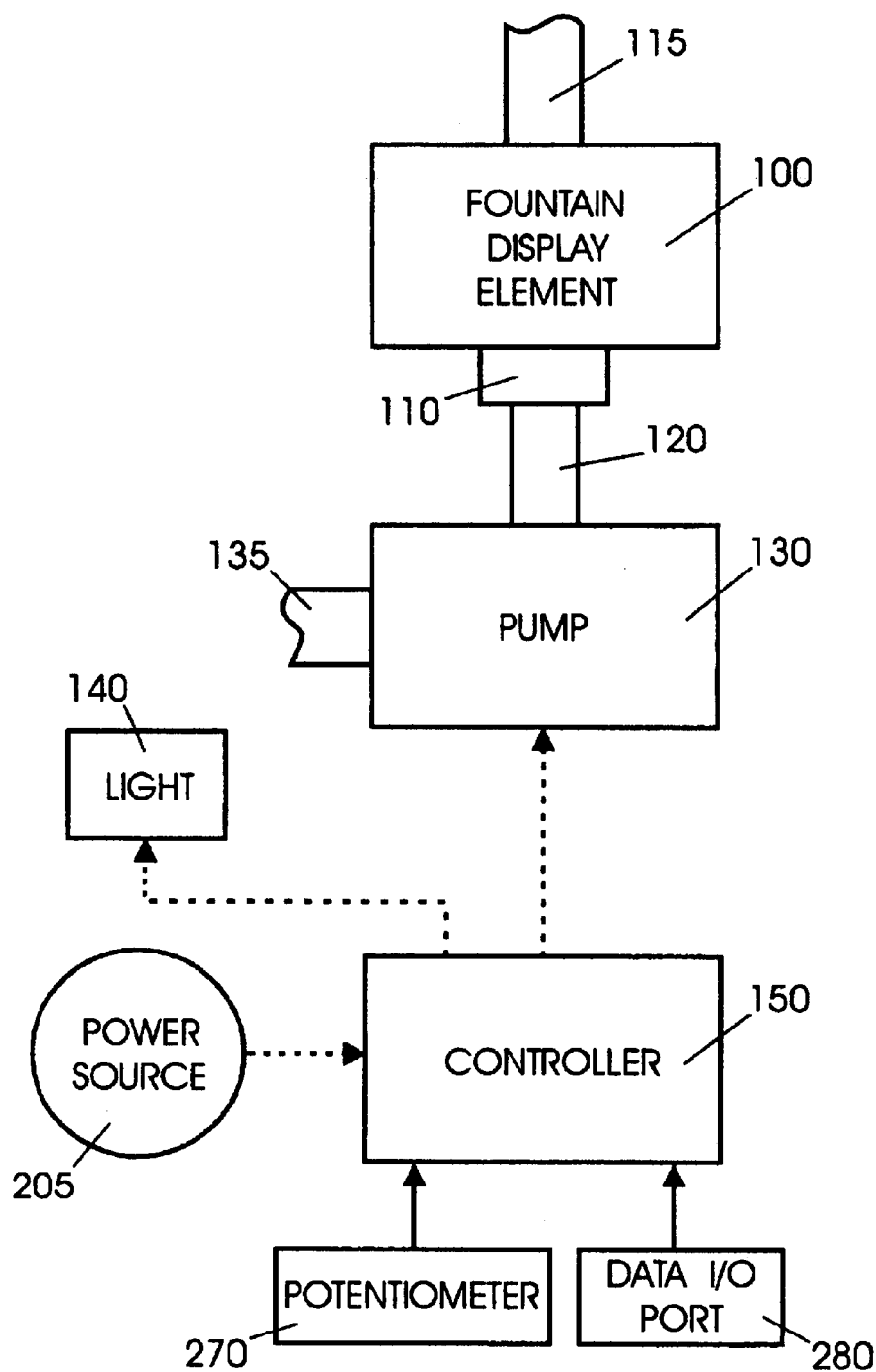
FIG. 1 is a block diagram of a fountain with pump and controller.

FIG. 1 shows a block diagram of a fountain with pump and controller. The dotted lines in FIG. 1 designate electrical connections. The fountain comprises fountain display element 100, pump 130, controller 150, and optional light 140.

Pump 130 is comprised of an alternating current permanent-magnet synchronous motor (PMSM) with a magnetic rotor having a rigidly coupled impeller. Preferably pump 130 is designed to be powered by 12 VAC and is submersible.

Pump 130 has water inlet 135 and outlet conduit 120. Outlet conduit 120 couples to fountain display inlet coupling 110 of fountain display element 100. For descriptive purposes fountain display element 100 can be considered to be a nozzle although a multiplicity of outlets of varying configuration can alternatively be specified. Although not shown in FIG. 1 it is assumed water is continually available at inlet 135 of pump 130 and exits fountain display unit at 115 (for the case of a single nozzle).

Controller 150 is powered by power source 205, which is preferably 12 VAC. The output of 150 is a series of voltage pulses of width and frequency predetermined to yield a desired no load flow rate at the outlet conduit of pump 130. To accomplish this controller 150 converts alternating current from 205 to direct current which is then converted to a pulse width and frequency modulated output suitable for driving the pump mechanism. This is implemented by a micro-controller-driven power output switching circuit.

The series of pulses defining the pulsed waveform to the pump can be stationary or can be time-varying to reflect variations of input signals from various sources (such as a microphone) and/or to reflect pre-programmed variations set by an internal stored program. Advantageously, this pulse train also provides power to optional light 140 which varies in brightness according to changes in the instantaneous no load flow rate of the pump.

Controller 150 has several modes of operation that are user-selectable. These modes of operation are addressable by a multi-position mode switch. The primary modes of operation comprise 1) a programmed flow-variation mode, 2) a manual flow-setting mode, 3) an audio input mode and 4) an external data I/O mode.

In the programmed flow-variation mode the controller executes a pre-programmed sequence of commands to cause pump flow rate to vary in a pre-determined manner. In doing so, the controller generates a complex sequence of flows by combining and repeating several elementary operations in a pre-determined fashion. These operations include (but are not limited to) 1) ramping from one set flow rate to another, 2) setting the ramp change rate for a given ramp operation and 3) setting the time delay between successive operations. These operations allow for a wide variation in pump behavior (i.e. gentle to rapid ramping between two flow rates, short to long constant flows and flow "spikes"). Several programmed flow-control regimes can be accommodated by additional positions on the user-selectable mode switch.

In the manual flow setting mode the user sets the desired (constant) flow rate by adjusting a potentiometer.

In the audio input mode a microphone or external audio input is used to cause the pump to proportionally vary in flow rate in response to a sound signal.

In the external data I/O mode a digitally derived control signal is used to control pump output.

Figure 2:
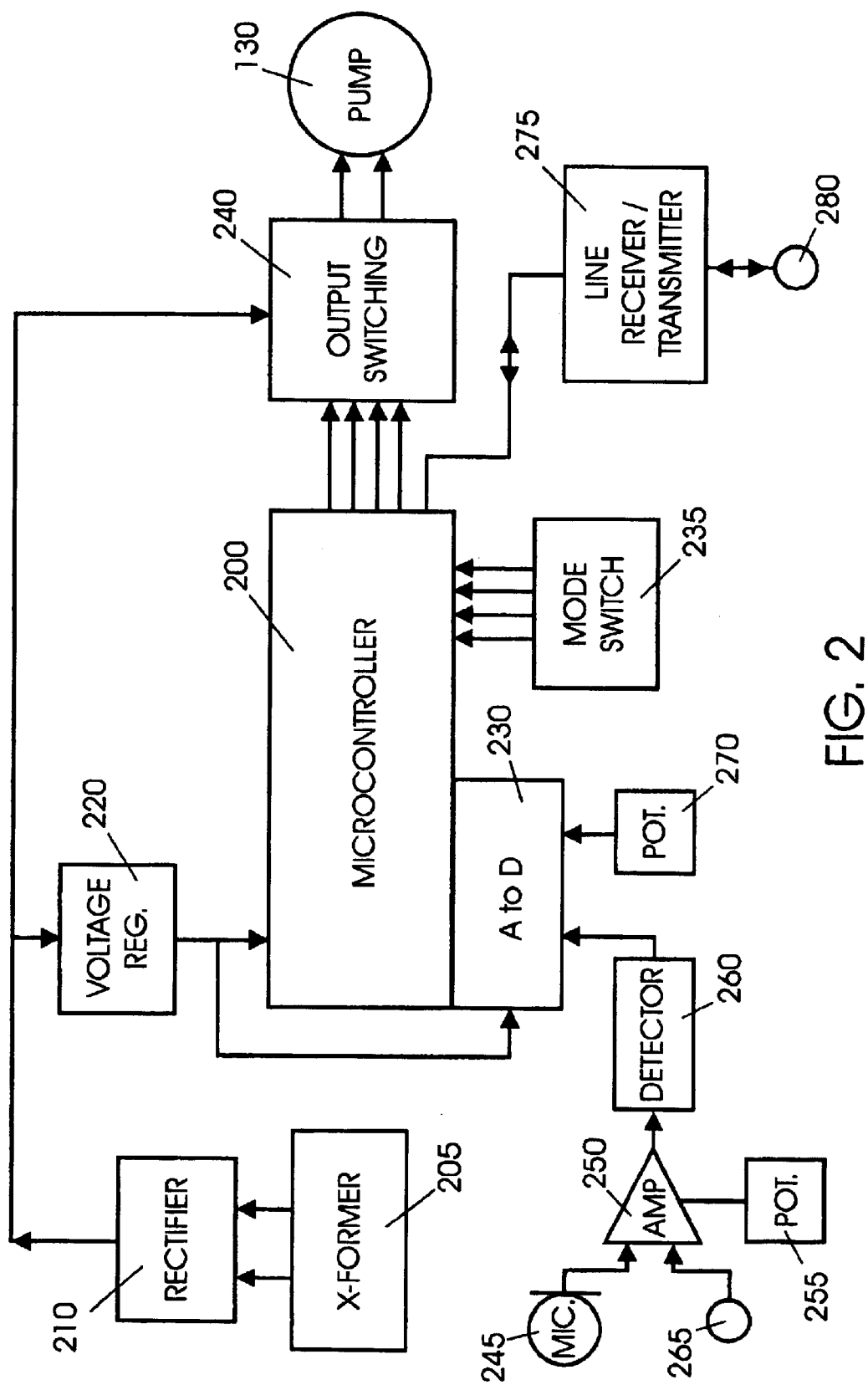
FIG. 2 is a block diagram of the controller circuitry for controlling a low voltage AC PMSM pump.

A block diagram of controller 150 is shown in FIG. 2. Controller 150 is comprised of rectifier circuitry 210, voltage regulator 220, micro-controller 200, A/D converter 230, mode switch 235, output power switching circuitry 240, microphone 245, audio amplifier 250, audio gain potentiometer 255, multi-purpose potentiometer 270, external audio input 265, line receiver/transmitter 260 and external data input/output port 280.

Micro-controller 200 is preferably a programmable micro-controller such as the PIC 16C5x although other families of micro-controllers of greater complexity may alternatively be specified depending on the complexity of the programmed modes and whether multiple pumps are to be synchronously controlled by the same micro-controller.

Micro-controller 200 performs several operations:

First, it stores program information for the calculation and formation of the required output (pump drive) switching signals.

Second, it stores a sequence of instructions necessary to produce a predetermined multiplicity of pump actions.

Third, it arithmetically calculates the pulse width and frequency timing for the output signals necessary to drive power-switching circuit 240 and thereby pump 130. This calculation derives from information provided by either 1) the stored program, and/or 2) analog to digital conversion of signals from microphone 245, external audio input 265, external data I/O signal port 280 or potentiometer 270.

Fourth, it reads mode switch 235 to thereby determine the required program flow mode.

Fifth, in 230 it performs analog to digital conversion of the signal produced by 1) the audio circuitry (detector circuitry 260 fed by either microphone 245 and microphone amplifier 250, and/or external audio input 265 and/or by potentiometer 270.

Sixth, when mode switch 235 is in external data I/O mode, micro-controller 200 decodes an externally derived digital control signal at 280 (e.g. DMX 512 format) via line receiver/transmitter 275 and uses such information to determine the instantaneous desired pump flow rate. Alternatively, it may transmit control data for synchronization with, or control over, other similar pump control units.

Output power switching circuit 240 preferably comprises a number of solid state power transistors (e.g. FET's, IGBT's, bipolar devices or hybrids thereof) arranged in a bridge, half bridge or push-pull configuration. These devices are driven by output from the micro-controller to produce a switched AC waveform of variable pulse width and frequency suitable for driving the pump 130. Power for the switched waveform is supplied to the switch circuit by rectifier circuitry 210, which is fed by low voltage AC from wall transformer unit 205.

Audio amplifier 250 amplifies the audio signal produced by microphone 245. A User-adjustable potentiometer 255 is provided to adjust the gain of the amplifier to allow setting the sensitivity of the controller to various levels of ambient sound. This signal is rectified (detected) by detector 260 to produce a varying DC signal proportional to the input audio level. Detector 260 then provides a time-varying DC level signal to A/D converter 230. Converter 230 then converts this signal to digital form for use by the micro-controller's internal program to affect the calculation of the output pulse waveform.

Detector 260 is preferably comprised of rectifier and capacitor/resistor filter circuitry. As shown in FIG. 2, external audio device 265 such as a music-reproducing device, radio receiver or television can also be fed into amplifier 250 to provide additional (or separate) audio inputs to the micro-controller.

Mode switch 235 is a multi-position switch which is read directly by micro-controller 200 as shown in FIG. 2. As described above, the information thereby supplied is used to determine the internal program flow of the micro-controller and thereby to affect the mode of operation of the circuitry.

Potentiometer 270 is provided for adjustment of various operational parameters by the end user. This device is used to produce a DC level which is "read" by analog to digital circuitry 230. The function of potentiometer 270 is determined by the program mode, which is in turn selectable, by mode switch 235. Typical functions of potentiometer 270 include but are not limited to: 1) manual variation of pump flow rate; 2) adjustment of the audio or external audio signal threshold; 3) selection of a sub-program for a given mode switch selection (pot position used as a "fuzzy" switch); 4) variation of the duration of each selection in a sequence of programmed selections (i.e. a scale factor in the programmed flow-variation mode); and 5) combinations of the above.

Figure 3:
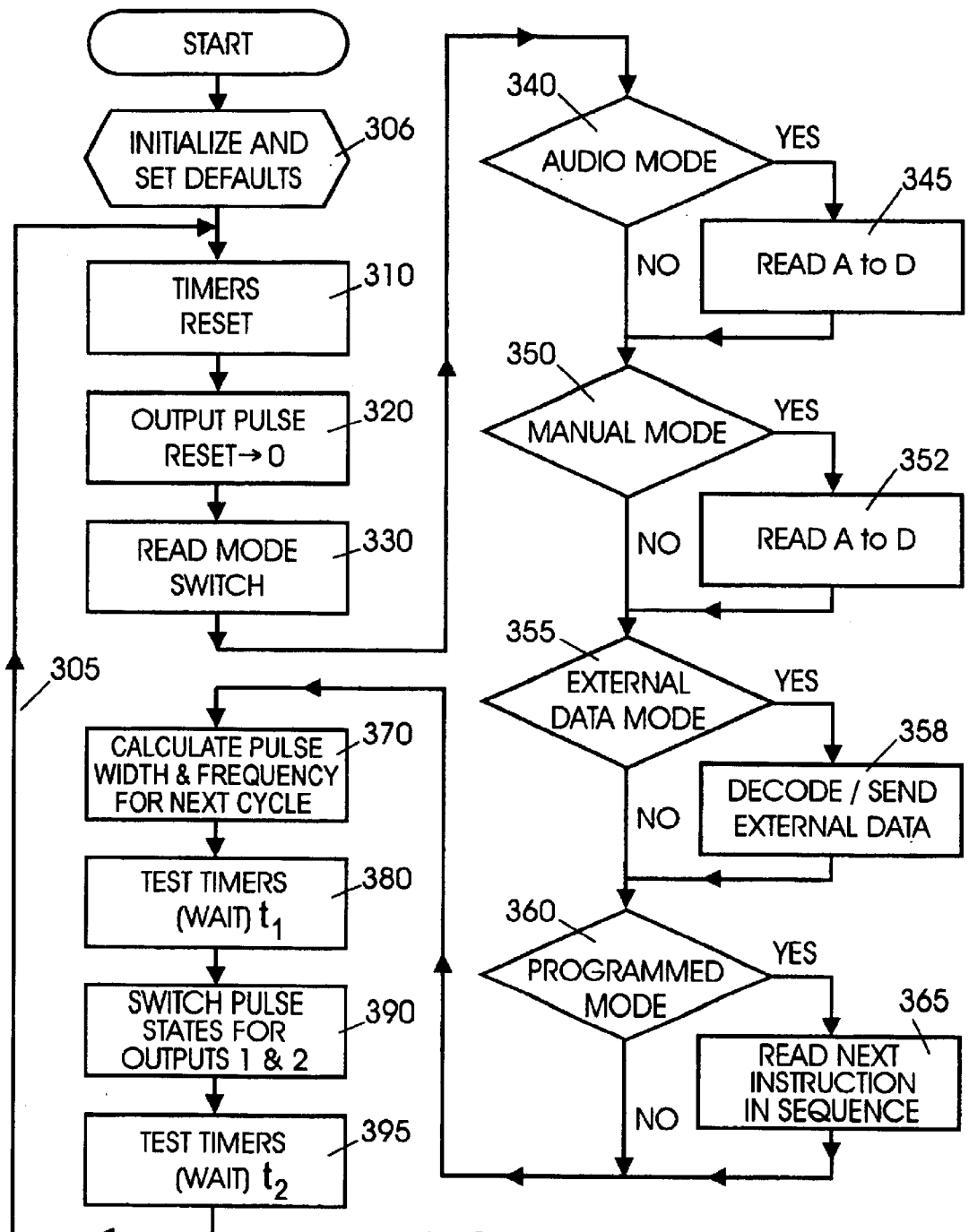
FIG. 3 is a flow chart of the program for varying the flow rate of the pump in FIG. 2 according to mode switch settings.

FIG. 3 shows a flow chart of a program for the micro-controller shown in FIG. 2. The program essentially comprises a repeated loop (305) which switches the output waveforms from one state to the next (390) to generate the output pulsed waveforms which powers pump 130. The timing of this output state switching is the essential purpose of loop 305 and its associated sub-routine timings.

Figure 4:
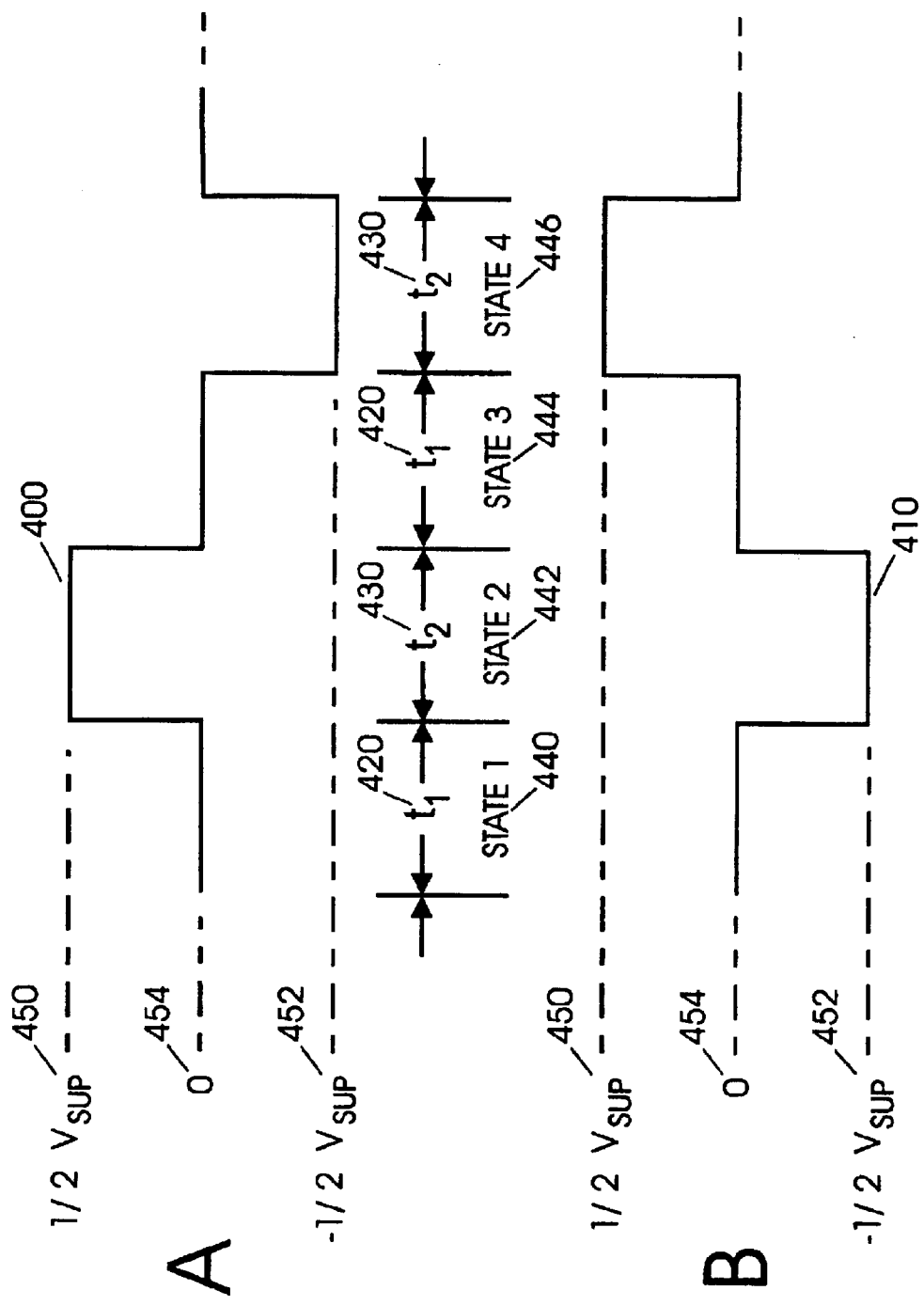
FIG. 4 is an output state diagrams for outputs 1 and 2.

FIG. 4 shows a graphical output state diagram for one pulse cycle for the case of differential drive. As shown, there are two outputs, Output 1 (400) (labeled "A") and Output 2 (410) (labeled "B") wherein Output 2 is the inverse of Output 1. States 1 and 3 (440, 444) are the "dead time" states with duration equal to $t_1$ (420). In state 1 and state 3 the output pulses are set such that zero volts appears across the pump motor. States 2 and 4 (442, 446) are the "pulse states" having duration equal to $t_2$ (430). In state 2 and state 4 the voltage appearing across the motor is approximately equal to $+v_{sup}$ and $-v_{sup}$, respectively. Thus the three voltage levels appearing across the pump motor are $+v_{sup}$, $-v_{sup}$ and zero. These are switched for Output 1 and Output 2 in program block 390) of FIG. 3.

Alternatively for some applications a single output, Output 1, may be switched in a similar manner. In such a case the required DC supply voltage ($V_{sup}$) would be approximately double that of the differential output version depicted in FIG. 4.

The required output state timing (block 370 in FIG. 3) is calculated such that the repetition rate frequency $\{f=1/(2 \times (t_1+t_2))\}$ of the output pulse waveform and the pulse width $t_2$ (430) of the voltage waveform feeding pump 130 is optimally determined for a given desired pump flow rate. Programmatically, this information is derived 1) arithmetically or 2) from "look up" tables incorporated into the internal micro-controller program or from both and is determined in such a manner as to provide a waveform with characteristics most suitable for pump drive within acceptable pre-determined maximum and minimum flow rates that avoid stalling. To this effect, determination of the required flow rate may be a function of any combination of audio or external signal level, potentiometer settings, switch setting and instruction sequence reads.

The program in FIG. 3 shall now be described.

Initialize and Set Defaults block 306 initializes the micro-controller and sets initial default settings for generating a start-up pump flow rate. Timers Reset block 310 resets the timers to zero. Output Pulse Reset block 320 resets Output 1 and Output 2 to zero (states 1 and 3 in FIG. 4).

Read Mode Switch block 330 then reads mode switch 235 to determine program mode; this may set other parametric values depending on the switch setting. A sequence of decision blocks are then executed for each of the switch modes described previously. These are Audio Input Mode decision block 340, Manual Flow Setting Mode decision block 350, External Data I/O Mode decision block 355 and Programmed Flow-Variation Mode decision block 360. Depending on whether the result of each of these blocks is "yes" or "no", various program. functions (345, 352, 358, 365) are performed as shown in FIG. 3. Note that the flow chart allows the potential for a given mode to influence modes further down in the sequential chain.

Next, Calculate Pulse Width & Frequency block 370 calculates the desired frequency and pulse width values for $t_1$ and $t_2$ for the next cycle based on the results of the above decision blocks and subsequent operations. Test Timers block 380 then initiates a programmed wait $t_1$ until the time for the next state change for Outputs 1 and 2. When this expires, the Switch Pulse States block 390 switches Outputs 1 and 2 to their next respective states. Test Timers block 395 then initiates a second programmed wait $t_2$. After this wait expires, the program returns to Timers Reset block 310 to close the loop (305).

The impeller and rotor of pump 130 for use in conjunction with controller 150 in FIG. 1 shall now be discussed. In order for pump 130 to operate without noise and chatter when driven by controller 150, rigid coupling of the rotor and impeller is required. This is a consequence of the pulsed nature of the input to the pump supplied by switching circuit 240 in FIG. 2. If commonly used slip-clutch arrangements were alternatively specified, which would allow the impeller to rotate freely for a portion of one revolution before engaging, chatter and noise would ensue; this would be exacerbated under conditions of variable pump back-pressure.

Aside from eliminating chatter and impeller noise, an allied benefit of the rigid rotor/impeller assembly when used in a PMSM pump coupled with controller 150 is that starting problems that are a major concern with PMSM pumps of the type used in aquariums and small fountains are completely eliminated.

It should be noted specifying a rigid coupling of the impeller and rotor is in direct opposition to the slip-type couplings commonly used with PMSM pumps to reduce starting problems when such pumps are operated with AC power from the mains or from step-down transformers. In fact, simple PMSM submersible pumps for aquarium and/or fountain use would not start when powered by conventional AC line sources if they employed the fixed rotor and impeller assembly of this invention.

Figure 5:
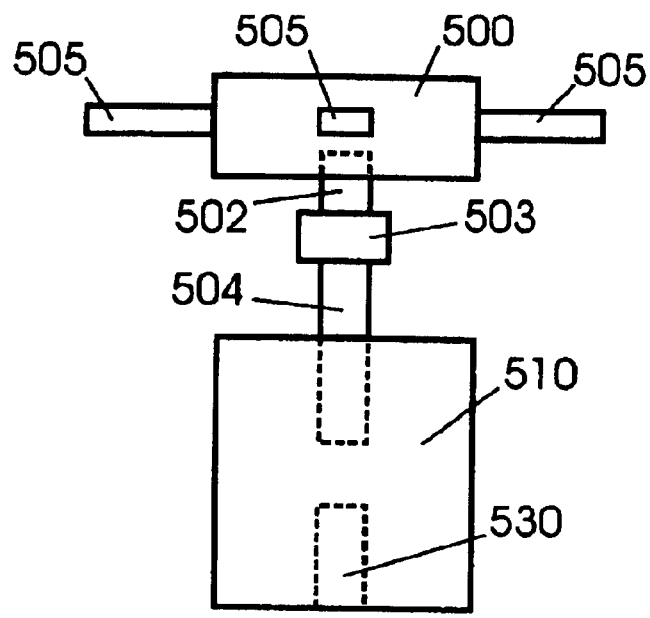
FIG. 5 is a side view of a first embodiment of a rotor and impeller assembly according to this invention.

FIG. 5 shows a side view of a first embodiment of a rotor and impeller assembly for PMSM pump 130 according to this invention. The assembly is comprised of rotor 510, rotor shaft 504, coupling 503, impeller shaft 502 and impeller 500 with plurality of evenly spaced impeller blades 505. Impeller 500, shafts 502 and 504, coupling 503 and magnetic rotor 510 are concentric with one another. Impeller shaft 502 is press-fit into impeller 500 allowing no relative motion. Similarly, rotor shaft 504 is press-fit into rotor 510 allowing no relative motion. Coupling 503 rigidly couples shafts 502 and 504 without allowing their relative rotation. Cylindrical opening 520 in rotor body 510 is provided to freely receive a fixed shaft in pump 130 (not shown) for constraining side-to-side motion and wobble of the impeller assembly when it rotates in the pump motor's magnetic field.

Figure 6:
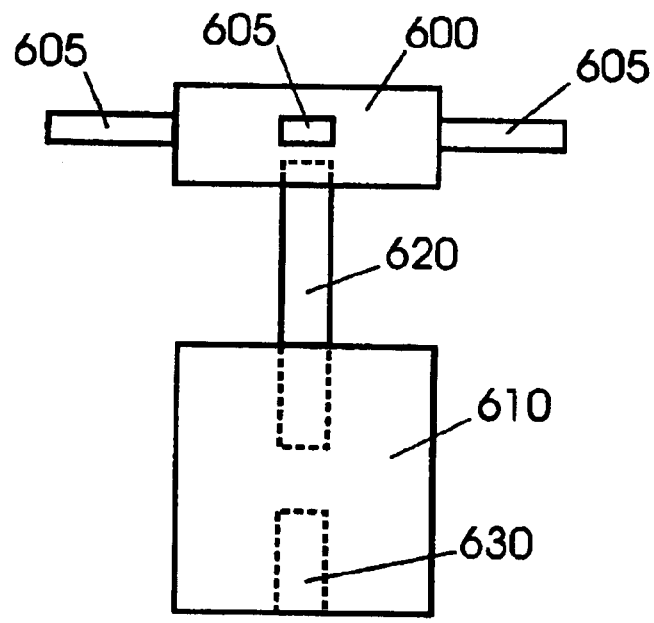
FIG. 6 is a side view of a second embodiment of a rotor and impeller assembly according to this invention.

FIG. 6 shows a side elevation view of a second embodiment of a rigid rotor/impeller assembly for use with controller 150. In this embodiment shaft 620 is press-fit into rotor 610 and impeller 600 so as to preclude relative rotation of 600 and 630. As in the first embodiment of FIG. 5, a cylindrical opening 630 in rotor body 610 is provided to freely receive a fixed shaft in pump 130 (not shown) for constraining side-to-side motion and wobble of the impeller assembly when it rotates in the pump motor's magnetic field.

Various modifications of the disclosed invention can be considered without deviating from its scope. As one modification, a multiplicity of pumps can be controlled by a single micro-controller 200. This would allow synchronization of multiple pumps either by programmed mode or by combinations of audio input, external data I/O (i.e. DMX 512 format) and programmed mode. In this instance a microprocessor with the appropriate number of I/O ports and sufficient programmed memory would be chosen based on program requirements and the number of pumps to synchronize.

As another modification, a multiplicity of pumps could be controlled by multiple similar micro-controller circuits such as described above with each device communicating or synchronizing operation through a digital communication mechanism.

As another modification, other switches may also be provided either as replacement for or in addition to potentiometer 270 to allow the micro-controller to determine other operational parameters based on user input.

As another modification, a unit similar in operational principle to that described except working directly off of line voltage (no wall transformer) and driving a high voltage (e.g. 110 volts AC) pump can be realized. The potential drawback of this modification would be the potentially lethal voltages generated by the circuitry.

As another modification, while four impeller blades are shown in FIG. 5 and FIG. 6, alternative numbers of blades may alternatively be specified to optimize the operating characteristics of a particular pump.

Although there has been shown and described hereinabove a specific arrangement of a fountain and control for generating dynamically changing flow patterns in accordance with the invention for the purpose or illustrating the manner in which the invention may be used to advantage, it will be appreciated that the invention is not limited thereto. Accordingly, any and all modifications, variations, or equivalent arrangements that may occur to those skilled in the art should be considered to be within the scope of the invention as defined in the annexed claims.

What is claimed is:

1. An apparatus for providing a variable flow of liquid, comprising:
   a. an AC permanent magnet synchronous motor pump controller comprising a programmable micro-controller with means generating AC pulse switching signals applied to said motor pump for varying the flow rate of said motor pump over an extended range of flow rates in accordance with said AC pulse switching signals, further comprising means setting the frequency of said AC pulse switching signals for obtaining a given speed of said motor pump, wherein said speed is synchronous to said frequency for all realizable speeds of said motor pump, and further comprising means setting the pulse width of said AC pulse switching signals in relation to said frequency for a given motor speed in order to maintain constant and continuous flow for any given realizable speed of said motor pump; and
   b. an output switching circuit incorporated into said controller, for generating said AC pulse switching signals and for driving said motor pump in direct synchronization with the frequency of said AC pulse switching signals.

2. The apparatus of claim 1, further comprising an AC permanent-magnet synchronous motor pump with means defining a rotor and impeller integrally coupled to said motor pump, wherein said rotor and said impeller are immersed in a common liquid medium, wherein said rotor and said impeller are concentric and wherein said rotor and said impeller are rigidly and fixedly coupled to prevent relative rotation, for insuring that said motor pump will reliably start rotation when energized with said controller and for preventing impeller chatter when said motor pump is driven with said controller over a range of realizable rotation rates.

3. The apparatus of claim 2 further comprising a fountain directly coupled to said AC permanent magnet synchronous motor pump for generating variable water patterns comprising:
   a. at least one fountain element comprised of a water inlet and one or more water outlets for the flow of water.

4. The apparatus of claim 1, further comprising a mode switch for choosing the mode of operation of said micro-controller, wherein the mode of operation is selected from a group comprised of a programmed flow control variation mode, an audio input mode, a manual mode and an external data input/output mode.

5. The apparatus of claim 1 further comprising:
   a. audio circuitry with means varying the flow rate of an AC permanent magnet synchronous motor pump in proportion to a signal from a microphone or an external audio input, wherein said circuitry further comprises an amplifier with a first potentiometer for varying said amplifier's gain and a detector circuit for providing a varying DC level to an analog to digital converter for input into said micro-controller; and
   b. a second potentiometer coupled to said analog to digital converter for adjustment of operational parameters dependent on the switch position of said mode switch.

6. The aparatus of claim 5, further comprising rectifier circuitry for converting alternating current to direct current for driving said audio circuitry and said analog to digital converter.

7. The apparatus of claim 1, further comprising a line receiver/transmitter for interfacing an external DMX (digital multiplex) control signal to said micro-controller.

8. The apparatus of claim 1, further comprising a software program embedded in said micro-controller for controlling the behavior of said motor pump with said software program comprising means deriving in a related manner the pulse width and frequency of control signals to be applied to said output switching circuit and further comprising means generating said control signals in such a manner as to produce said AC pulse switching signals at the output of said switching circuit as required to synchronously drive said motor pump at the frequency of said AC pulse switching signals and with said AC pulse switching signals having a pulse width as required to maintain synchronization of said motor pump with said AC pulse switching signals over all realizable speeds.

9. A controller for varying the flow rate of an AC permanent-magnet synchronous motor pump comprising:
   a. a mode switch for selecting the mode of operation of the controller from a group comprised of a programmed flow control variation mode, an audio input mode, a manual mode and an external data input/output mode;
   b. a programmable micro-controller for calculating the pulse width and frequency timing for generating pulse switching signals to control said pump; and
   c. an output switching circuit for generating a pulsed waveform for driving said pump according to said pulse switching signals.

* * * * *